United States Patent [19]

Wolfram

[11] 3,801,271
[45] Apr. 2, 1974

[54] TREATMENT OF KERATIN FIBERS
[75] Inventor: Leszek J. Wolfram, Rockville, Md.
[73] Assignee: I.W.S. Nominee Company Limited, London, England
[22] Filed: July 12, 1971
[21] Appl. No.: 161,978

[52] U.S. Cl.................... 8/115.6, 8/127.5, 8/127.6, 8/128 R, 8/128 A, 117/141
[51] Int. Cl............................................ D06m 13/00
[58] Field of Search............. 8/127.6, 128 R, 128 A, 8/127.5, 115.6; 117/141

[56] References Cited
UNITED STATES PATENTS
3,589,856  6/1971  Wolfram ............................ 8/127.5
3,644,084  2/1972  Hsiung et al. ...................... 8/127.51

OTHER PUBLICATIONS
Wolfram et al., American Dyestuff Reporter, Feb. 13, 1967, pages 31–37.

Primary Examiner—Leon D. Rosdol
Assistant Examiner—H. Wolman
Attorney, Agent, or Firm—Stowell & Stowell

[57] ABSTRACT

The set stability of keratin fibers, particularly wool fibers, is improved by polymerizing a halogen-containing vinyl or acrylic compound in the fibers and thereafter reacting the deposited polymer with a thiosulfate. Polymerization of the vinyl or acrylic compound can be readily effected in the presence of persulfuric acid and a tetrakis-(hydroxymethyl)-phosphonium salt.

7 Claims, No Drawings

TREATMENT OF KERATIN FIBERS

The invention relates to a method for improving the set stability of keratin fibers, such as wool and hair and of yarns and fabrics comprising such fibers and to novel compositions for carrying out the method.

I have found that the set stability of keratin fibers, for example, the stability of curls in fibers, threads and yarns, and creases in fabrics and garments containing keratin fibers, when subjected to wetting can be substantially improved by polymerizing a halogen-containing vinyl or acrylic compound possessing a labile halogen atom in the fibers either in loose form or in the form of yarn or fabrics and thereafter reacting the deposited polymer with a thiosulfate whereby the halogen is replaced, at least in part, by thiosulfato groups, thereby forming so-called "Bunte salt" compounds (H. Bunte, Berichte, 7, 646, 1874).

Examples of labile halogen containing monomers suitable for the practice of this invention are vinyl chloroacetate, chloromethylstyrene, chloromethyl acrylate, bromoethyl methacrylate, N-(2-chloroethyl) methacrylamide.

The polymerization of the halogen-containing vinyl or acrylic compound in the fiber is advantageously carried out under acid conditions, preferably at a pH of 1.5 to 3.5, in the presence of a peroxide catalyst such as persulfuric acid and an oxygen scavenger such as tetrakis-(hydroxymethyl)-phosphonium chloride. (L. J. Wolfram and J. Menkart, Amer. Dyestuff Rep., 56, 31, 1967) Dispersion of the vinyl or acrylic monomer in aqueous treating composition is facilitated by dissolving the monomer in a water-miscible organic solvent such as ethanol and admixing the solution with an acidified aqueous solution containing polymerization initiating persulfate. In general, the polymerization, as measured by the increase in weight of the fibers immersed in the solution, takes place at moderate rates at normal ambient temperatures.

After termination of the polymerization by removal of the fibers and rinsing with water, the polymers in the fibers are converted to Bunte salt derivatives by immersion of the fibers in a solution of a thiosulfate in a suitable solvent, for example water or N, N-dimethylformamide.

The reaction scheme involving the displacement of halogen from polymers or copolymers by thiosulfate to yield the Bunte salt residues is illustrated by the example of vinyl chloroacetate in the following equation:

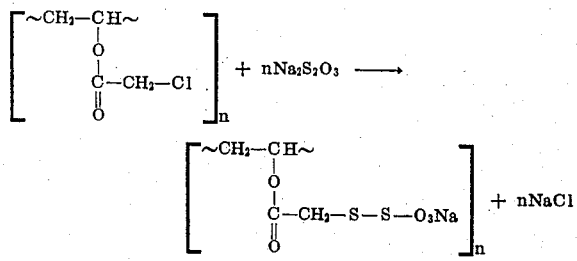

In the case of poly-(vinyl chloroacetate), complete displacement would result in a doubling of the molecular weight of the polymer; in the case of polymer-containing wool, an increase in weight occurs following thiosulfate treatment. In addition to measuring the increase in weight obtained, the efficiency of the displacement step can also be monitored by hydrolyzing the treated wool and determining the increase in its thiol content.

Based on measurements of both the weight changes of treated wool and its Bunte salt content, the displacement reaction can go to 85 percent completion. This level of Bunte salt residues can be attained within 2 hours at 70°C. or in little over 30 minutes at the boil.

The most perceptible change in the properties of the polymer-containing wool after thiosulfate displacement is that of fiber-water interaction. For example, fabric containing a deposit of poly-(vinyl chloroacetate) is hydrophobic and swells little in water; the same fabric after formation of Bunte salt is readily wettable and imbibes a large quantity of water. Of more practical importance is the fact that the Bunte salt polymer-containing wool shows remarkable improvement in its settability, and in the stability of the imparted set, for example, crimp, crease, pleat, or flat state. This beneficial effect is noted at levels as low as 0.25 m M/g of wool treated.

Bunte salts are known to react with mercaptans to form disulfides. Bunte salt polymer-containing wool also reacts very readily with mercaptans; the reaction is accompanied by a drastic decrease in swelling of the wool and substantial lowering of overall sulfur content. The reaction results in extensive cross-linking of the polymer with itself and to a certain extent with cysteine residues present in the keratin moiety of the wool. Such cross-linking produces a stabilization or setting of the fibers, yarn or fabric in the configuration in which it was done; permanent crimping, flat setting, creasing or pleating is thereby accomplished.

The principle of the invention and some of the variations in its application are illustrated in the following examples:

A worsted flannel weighing 5.2 oz/sq. yard (Testfabrics Inc., New York, Style 503A) was used as the test fabric. Samples of the flannel were purified by washing with 0.1 percent Triton X-100 followed by rinsing in deionized water. The fabric was then centrifuged and conditioned at 65 percent RH and 22.2°C. Detergent-washed New Zealand carpet wool was used as the test fibers.

Bunte salts hydrolyze to yield sulfuric acid and the corresponding mercaptans on treatment with hot acids. This feature was utilized in the analysis of the deposited polymer. Approximately 0.1 g of polymer-containing wool was hydrolyzed in 15 ml of 25 percent (vol/vol) $H_2SO_4$ for 2 hours at 105°C. After cooling, the solution was made up to 100 ml with deionized water, five milliliter aliquots were then withdrawn, made alkaline by addition of sodium carbonate and the mercaptan in them was titrated with salyrganic acid using sodium nitroprusside as the indicator.

The liquid retention technique, as described by Valko et al., J. Soc. Cosmetic Chemists, 3, 2 (1952) was used to determine the swelling of polymer-containing wool. Samples of wool (0.2–0.5 g) were immersed in the required buffer for 30 minutes and quickly placed in the centrifuge tubes on wire supports so designed that the wool rested on the wire 1 ¾ inches from the bottom of the tubes. The tubes were capped and centrifuged for 10 minutes at approximately 1,000 g; the samples were immediately transferred to tared weighing bottles and weighed. The amount of buffer retained (a measure of fiber swellability) is expressed as "liquid retention" in units of percentage of the dry weight of the sample.

Test creases were made parallel to the warp on a Hoffman press at 80 lbs. line steam pressure. The swatch was conditioned for at least 16 hours in 65% RH, 70°F atmosphere; it was then sprayed with a solution containing 0.1 percent Triton X-100 and 0.1M thioglycolic acid adjusted to pH 9.2 with ammonia. The sprayed swatch was then creased on the press by a 30 second steam 30 second bake cycle.

The creased samples were allowed to rest overnight in the laboratory atmosphere, with the crease closed, prior to relaxation. Then they were exposed to two levels of relaxation, "cold" and "hot."

a. Cold relaxation. The swatches, open and with crease vertical, were suspended in a deep beaker of water (0.1 percent Triton X-100) at 25°C; each sample was held by two binder clips which were attached to a glass rod. After 30 minutes the samples were withdrawn, dried by towel blotting and exposed to 65% RH, 70°F for at least 16 hours prior to assessment.

b. Hot relaxation. A procedure identical to that in cold relaxation was followed, except for the water temperature which was maintained at 60°C.

The relaxed creases were evaluated at 65% RH and with a standard oblique illumination. They were rated on a scale 5 = perfect crease, to 0 = no crease, with the aid of three standards representing the 5, 3, and 1 ½ levels on the scale.

The setting of single fibers was performed on stainless steel setting frames as described by Speakman, J. Soc. Dyers Colorists 52, 423 (1936).

The general procedure used for the deposition of polymer derived from vinyl chloroacetate in wool fibers and wool fabric was as follows: the monomer, previously distilled to remove inhibitor (5g), was dissolved in 50 cc of absolute ethanol and to this solution was added with stirring 50 cc of 0.02N $H_2SO_4$ containing 0.6% $(NH_4)_2S_2O_3$ and 0.6% THPC. The solution was placed in a conical flask, a 2 g sample of wool was introduced, the flask was stoppered and kept for the required time in a constant temperature bath at 30°C. At the end of the reaction time the wool was removed from the flask, rinsed for at least 15 minutes in running tap water, blotted, equilibrated in the conditioning room and weighed. The polymer add-on was expressed as the weight increase (in percent) of the conditioned untreated wool sample. Table I gives the results obtained at different deposition times.

TABLE I

EFFECT OF TIME ON THE POLYMERIZATION OF VINYL CHLOROACETATE IN WOOL AT 30°C

| Time of Polymerization (min) | Polymer Add-on (1%) Wool Fibers | Wool Fabric |
|---|---|---|
| 30 | 4.5 | — |
| 60 | 6.8 | 5.7 |
| 120 | 9.9 | 8.7 |
| 180 | 12.5 | 10.6 |
| 240 | — | 14.5 |
| 360 | — | 19.1 |

The hand of the treated wool was soft and the fibers appeared slightly whiter than the untreated.

Wool flannel containing 14.5 percent of poly-(vinyl chloro-acetate) was used for the displacement studies. The samples (0.2 g) of polymer-containing fabric were treated with 50 ml of 0.1N $Na_2S_2O_3$ in aqueous ethanol at 70°C for various lengths of time. At the end of the reaction period the samples were removed, rinsed for at least 10 minutes in a few changes of deionized water, blotted, equilibrated at 65% RH and 70°F and weighed. The chemical analysis for Bunte salt content was carried out by hydrolysis and salyrganic acid titration (Table II).

TABLE II

EFFECT OF TIME AND TEMPERATURE ON FORMATION OF BUNTE SALT RESIDUES IN POLYMER-CONTAINING WOOL

| Temperature °C | Time of Treatment (min) | Weight Increase % | Bunte Salt Content (meq/g of wool) |
|---|---|---|---|
| — | 0 | — | 0.02 |
| 70 | 15 | 3.6 | 0.34 |
| 70 | 30 | 5.2 | 0.49 |
| 70 | 60 | 8.2 | 0.82 |
| 70 | 120 | 10.5 | 0.98 |
| 70 | 180 | 10.5 | 1.02 |
| steam bath | 30 | 8.9 | 0.84 |
| 70 | 120* | 0.1 | 0.02 |

*Control experiment on untreated wool flannel

A brief study was made of the swelling properties of the Bunte salt polymer-containing wool as a function of pH. The results are presented in the form of liquid retention values in Table III.

TABLE III

EFFECT OF pH ON SWELLING OF BUNTE SALT POLYMER-CONTAINING WOOL (BUNTE SALT CONTENT - 0.94 meq/g)

| pH | Liquid Retention |
|---|---|
| 1 | 54.5 |
| 2 | 56.1 |
| 4 | 56.1 |
| 5.2 | 64.5 |
| 7 | 89.1 |
| 9 | 92.0 |

The increase in swelling at a given pH is a convenient, albeit indirect, measure of the extent of the displacement reaction. This is illustrated with a sample of wool containing 14.5 percent of poly-(vinyl chloroacetate) which was treated for various lengths of time with sodium thiosulfate solution. The results are given in Table IV.

TABLE IV

EFFECT OF TIME OF THIOSULFATE TREATMENT ON THE SWELLING OF WOOL AT pH 7

| Time of Treatment (at the boil) (min) | Liquid Retention % Polymer Containing Wool | Untreated Wool |
| --- | --- | --- |
| 0 | 29.1 | 34.2 |
| 15 | 45.4 | 35.2 |
| 30 | 68.5 | 37.1 |
| 60 | 93.5 | 40.2 |

Elimination of Bunte salt residues by reaction with mercaptans restores the original electrostatic balance of the fiber and its swelling characteristics as well as cross-linking the polymer. This is shown in Table V which contains liquid retention data of Bunte salt polymer-containing wool after its reaction with cysteine.

TABLE V

LIQUID RETENTION OF BUNTE SALT POLYMER-CONTAINING WOOL AFTER NEUTRALIZING WITH CYSTEINE

| pH | Liquid Retention % |
| --- | --- |
| 2 | 35.3 |
| 5 | 33.1 |
| 7 | 33.8 |

Swatches of flannel were creased in the Hoffman press, relaxed in cold and hot water and rated. The results are given in Table VI.

TABLE VI

| Sample | Crease Rating Cold Water | Hot Water |
| --- | --- | --- |
| Untreated control | 3.5 | 1.5 |
| Control + 30 minutes thiosulfate at the boil | 4.0 | 2.0 |
| Wool containing 14% of poly-(vinyl chloroacetate) | 3.0 | 1.5 |
| Wool containing 0.2 meq/g of Bunte salt polymer | 4.5 | 4.0 |
| Wool containing 0.6 meq/g of Bunte salt polymer | 5.0 | 4.5 |
| Wool containing 1.0 meq/g of Bunte salt polymer | 5.0 | 5.0 |

The improvement in set stability imparted to wool by deposit of the Bunte salt polymer is clearly perceptible even at low values of add-on.

It was observed that creased swatches of untreated wool exhibited some wrinkling, edge rolling and unravelling on wetting and air drying. In striking contrast Bunte salt polymer-containing wool was smooth, flat and ravel-free.

Wool fibers of different add-on levels of Bunte salt polymer were mounted on setting frames, extended in water to 140 percent of their original length and transferred to 0.05N cysteine in pH 8 buffer at 25°C. After 15 minutes the frames were removed, the fibers rinsed with water for 1 minute, released and relaxed in deionized water at 35°C for 10 minutes, 1 hour, and 24 hours. At each time interval the fibers were removed from water, dried and their length measured. The obtained results are given in Table VII.

TABLE VII

| Wool | % Set Retained After 10 min | 1 hr. | 24 hrs |
| --- | --- | --- | --- |
| Untreated | 2.1 | nil | nil |
| Containing 14% of poly-(vinyl chloroacetate) | 5.2 | 0.2 | nil |
| Containing 5% Bunte salt polymer | 22.6 | 12.0 | 8.5 |
| Containing 9% Bunte salt polymer | 27.0 | 17.5 | 12.4 |
| Containing 12% Bunte salt polymer | 27.9 | 19.2 | 16.8 |

The general procedure used for the deposition of polymer derived from N-(2-chloroethyl) methacrylamide in wool fibers and wool fabrics was as follows: 2 g of monomer was dissolved in 25 cc of absolute ethanol (dioxane or methanol can be used instead), and to this solution was added with stirring 25 cc of 0.2N $H_2SO_4$ containing 0.6% $(NH_4)_2S_2O_3$ and 0.3% THPC. The solution was placed in a conical flask, a 2 g sample of wool was introduced, the flask was stoppered and maintained at 25°C. After 30 minutes 0.1 cc of 90 percent thioglycolic acid was introduced, and the reaction allowed to continue for a further 60 minutes. After this time, the wool was removed from the flask, rinsed thoroughly with water, blotted and air dried. The weight increase recorded on drying indicated a polymer deposit of 26.5 percent.

Two general procedures for preparing the Bunte salt derivative of this polymer are as follows:

a. A sample of the polymer-containing wool (1 g) was immersed in 50 cc of 0.1N $Na_2S_2O_3$ in 50 percent aqueous ethanol at 70°C for 30 minutes, rinsed and dried. A determination of the Bunte salt content of the treated wool yielded a value of 0.75 mM/g.

b. A sample of the polymer-containing wool (1 g) was immersed in 50 cc of a 0.1N $MgS_2O_3$ solution in dimethyl formamide at 50°C for 15 minutes, rinsed and dried. The Bunte salt content of this product was 0.85 mM/g.

Other variations in the method of the invention will suggest themselves to those skilled in the art and the invention is as claimed.

I claim:

1. Method of treating keratinous fibers which comprises polymerizing in the fibers a vinyl or acrylic monomer possessing a labile halogen atom to deposit in the fibers a polymer containing the labile halogen atom and thereafter reacting the deposited polymer with a thiosulfate to replace the labile halogen atoms with Bunte salt radicals.

2. Method of treating keratinous fibers as defined in claim 1 wherein the vinyl compound is vinyl chloroacetate.

3. Method of treating keratinous fibers as defined in claim 1 wherein the acrylic compound is N-(2-chloroethyl) methacrylamide.

4. Method of treating keratinous fibers as defined in claim 1 wherein the polymerization of the vinyl compound is effected under acid conditions in the presence of a peroxide catalyst and a scavenger for oxygen.

5. Method of treating keratinous fibers as defined in claim 1 wherein the deposited and thiosulfate reacted polymer is cross-linked with itself and with the keratinous fibers by reaction with cysteine or thioglycolic acid.

6. Keratinous fibers produced by the method of claim 1.

7. Keratinous fibers produced by the method of claim 5.

* * * * *